（12）United States Patent
Fan et al.

US010086557B2

(10) Patent No.: US 10,086,557 B2
(45) Date of Patent: *Oct. 2, 2018

(54) POLYESTER COMPOSITION, ELECTRONIC DEVICE, AND METHOD OF FORMING FILM

(71) Applicant: INDUSTRIAL TECHNOLOGY RESEARCH INSTITUTE, Hsinchu (TW)

(72) Inventors: Cheng-Hsing Fan, Taichung (TW); Chun-Yen Chen, Tainan (TW); Ming-Tsong Leu, Qishan Town (TW); Chien-Pang Wu, Xiushui Shiang (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 701 days.

This patent is subject to a terminal disclaimer.

(21) Appl. No.: 14/139,482

(22) Filed: Dec. 23, 2013

(65) Prior Publication Data

US 2015/0125709 A1    May 7, 2015

(30) Foreign Application Priority Data

Nov. 7, 2013   (TW) .............................. 102140425 A

(51) Int. Cl.
| | | |
|---|---|---|
| *C08L 67/00* | (2006.01) | |
| *C08L 67/02* | (2006.01) | |
| *C08L 67/03* | (2006.01) | |
| *C08G 63/12* | (2006.01) | |
| *C08G 63/123* | (2006.01) | |
| *C08G 63/127* | (2006.01) | |
| *C08G 63/137* | (2006.01) | |
| *C08G 63/16* | (2006.01) | |
| *C08G 63/18* | (2006.01) | |
| *C08G 63/183* | (2006.01) | |
| *C08G 63/199* | (2006.01) | |
| *B29C 47/00* | (2006.01) | |
| *B29C 47/36* | (2006.01) | |
| *B29C 47/40* | (2006.01) | |
| *B29C 47/88* | (2006.01) | |
| *B29C 55/00* | (2006.01) | |
| *B29C 55/02* | (2006.01) | |
| *B29C 55/10* | (2006.01) | |
| *B29C 55/12* | (2006.01) | |
| *B29D 11/00* | (2006.01) | |
| *B32B 27/36* | (2006.01) | |
| *B29C 55/16* | (2006.01) | |
| *C08J 5/18* | (2006.01) | |
| *B29K 67/00* | (2006.01) | |
| *B29K 105/00* | (2006.01) | |
| *B29L 7/00* | (2006.01) | |
| *B29L 11/00* | (2006.01) | |

(52) U.S. Cl.
CPC ............ *B29C 55/16* (2013.01); *C08G 63/199* (2013.01); *C08J 5/18* (2013.01); *C08L 67/02* (2013.01); *B29C 47/00* (2013.01); *B29C 47/0021* (2013.01); *B29C 47/0057* (2013.01); *B29C 47/36* (2013.01); *B29C 47/40* (2013.01); *B29C 47/88* (2013.01); *B29C 55/00* (2013.01); *B29C 55/02* (2013.01); *B29C 55/10* (2013.01); *B29C 55/12* (2013.01); *B29D 11/00* (2013.01); *B29K 2067/00* (2013.01); *B29K 2105/0085* (2013.01); *B29K 2105/0088* (2013.01); *B29L 2007/008* (2013.01); *B29L 2011/00* (2013.01); *B32B 27/36* (2013.01); *B32B 2307/518* (2013.01); *B32B 2307/734* (2013.01); *C08G 63/12* (2013.01); *C08G 63/123* (2013.01); *C08G 63/127* (2013.01); *C08G 63/137* (2013.01); *C08G 63/16* (2013.01); *C08G 63/18* (2013.01); *C08G 63/183* (2013.01); *C08J 2367/02* (2013.01); *C08J 2367/03* (2013.01); *C08J 2467/03* (2013.01); *C08L 67/00* (2013.01); *C08L 67/03* (2013.01); *C08L 2203/16* (2013.01); *C08L 2203/20* (2013.01); *C08L 2205/025* (2013.01); *Y10T 428/31786* (2015.04)

(58) Field of Classification Search
None
See application file for complete search history.

(56) References Cited

U.S. PATENT DOCUMENTS

| | | | | |
|---|---|---|---|---|
| 4,237,088 | A | * 12/1980 | Yoshimura | .............. B29C 55/04 264/235.8 |
| 4,474,918 | A | * 10/1984 | Seymour | .................. C08K 5/13 524/324 |

(Continued)

FOREIGN PATENT DOCUMENTS

| CN | 101210067 | * | 7/2008 |
|---|---|---|---|
| CN | 101210067 A | * | 7/2008 |

(Continued)

OTHER PUBLICATIONS

Argyropouls, John et al., "UNOXOL DIOL" Jun. 1, 2006.*

(Continued)

*Primary Examiner* — Vivian Chen
(74) *Attorney, Agent, or Firm* — Birch, Stewart, Kolasch & Birch, LLP

(57) ABSTRACT

Disclosed is a method for manufacturing a film. 50 wt % to 85 wt % of a first polyester and 50 wt % to 15 wt % of a second polyester are dried and mixed to form a mixture. The first polyester is polyethylene terephthalate (PET), polyethylene naphthalate (PEN), or combinations thereof. The second polyester is copolymerized of 1 part by mole of terephthalic acid, m parts by mole of 1,4-cyclohexanedimethanol (1,4-CHDM), n parts by mole of 1,3-cyclohexanedimethanol (1,3-CHDM), and o parts by mole of ethylene glycol (EG). $m+n+o=1$, $0 \leq o \leq 0.4$, $0.6 \leq m+n \leq 1$, and $0.06 \leq n/m \leq 1.31$. The mixture is melted and blended to form a polyester composition, which is extruded to form a sheet. The sheet is then biaxially stretched to obtain a film. The biaxially stretched film is then treated with a thermal setting.

20 Claims, No Drawings

(56) References Cited

U.S. PATENT DOCUMENTS

| | | | |
|---|---|---|---|
| 4,578,453 A * | 3/1986 | Jackson, Jr. | C08G 63/6826 528/299 |
| 5,124,388 A * | 6/1992 | Pruett | B65D 65/38 428/458 |
| 5,340,907 A * | 8/1994 | Yau | C08G 63/199 428/98 |
| 5,759,467 A | 6/1998 | Carter et al. | |
| 5,858,507 A * | 1/1999 | Yoshida | B29C 55/065 264/288.4 |
| 6,342,578 B1 * | 1/2002 | Huang | C08G 63/183 528/271 |
| 6,420,011 B1 | 7/2002 | Tsunekawa et al. | |
| 6,537,657 B1 * | 3/2003 | Watanabe | B41M 5/41 428/331 |
| 6,896,966 B2 | 5/2005 | Crawford et al. | |
| 7,101,627 B2 | 9/2006 | MacDonald et al. | |
| 7,118,799 B2 | 10/2006 | Crawford et al. | |
| 7,214,339 B2 | 5/2007 | Tsunekawa et al. | |
| 7,226,985 B2 * | 6/2007 | Hale | C08L 67/02 525/166 |
| 7,300,703 B2 | 11/2007 | MacDonald et al. | |
| 7,687,594 B2 * | 3/2010 | Hung | C08G 63/183 359/350 |
| 8,748,525 B2 * | 6/2014 | Wu | C08J 5/18 264/290.2 |
| 8,772,419 B2 * | 7/2014 | Jheng | B29C 47/92 264/210.1 |
| 2001/0018111 A1 * | 8/2001 | Sugie | B32B 3/30 428/156 |
| 2002/0146518 A1 * | 10/2002 | Kusume | B32B 27/36 428/1.33 |
| 2003/0060546 A1 * | 3/2003 | Moskala | B29C 67/24 524/284 |
| 2003/0106287 A1 * | 6/2003 | Yanuzzi | B29C 47/0004 53/453 |
| 2004/0101678 A1 | 5/2004 | Crawford et al. | |
| 2004/0101687 A1 | 5/2004 | Crawford et al. | |
| 2004/0214984 A1 * | 10/2004 | Keep | C08K 5/1515 528/359 |
| 2004/0265539 A1 * | 12/2004 | Hashimoto | C08J 7/04 428/141 |
| 2004/0265608 A1 * | 12/2004 | Pecorini | B29C 55/12 428/480 |
| 2006/0094858 A1 * | 5/2006 | Turner | C08G 63/199 528/272 |
| 2006/0134409 A1 * | 6/2006 | Pecorini | C08J 5/18 428/355 R |
| 2006/0270806 A1 * | 11/2006 | Hale | C08J 5/18 525/439 |
| 2008/0032144 A1 * | 2/2008 | Hashimoto | H05K 1/0326 428/480 |
| 2009/0192286 A1 * | 7/2009 | Argyropoulos | C08G 18/423 528/307 |
| 2009/0227735 A1 * | 9/2009 | Shih | C08J 5/18 525/54.21 |
| 2010/0113673 A1 * | 5/2010 | Leu | C08K 3/346 524/445 |
| 2010/0159176 A1 | 6/2010 | Hale et al. | |
| 2012/0070615 A1 * | 3/2012 | Shi | B29C 47/6056 428/143 |
| 2012/0149830 A1 * | 6/2012 | Wu | C08J 5/18 524/539 |
| 2012/0157604 A1 * | 6/2012 | Jenkins | C08L 67/02 524/537 |
| 2012/0157636 A1 * | 6/2012 | Neill | B32B 27/06 525/444 |
| 2012/0184669 A1 * | 7/2012 | Hale | C08K 3/22 524/539 |
| 2012/0196112 A1 * | 8/2012 | Kliesch | C08J 5/18 428/220 |
| 2012/0196979 A1 * | 8/2012 | Kliesch | C08G 63/181 524/605 |
| 2012/0196980 A1 * | 8/2012 | Kliesch | C08J 5/18 524/605 |
| 2013/0150532 A1 * | 6/2013 | Jheng | B29C 47/92 525/444 |
| 2013/0206636 A1 * | 8/2013 | Asthana | C08L 67/02 206/524.6 |

FOREIGN PATENT DOCUMENTS

| | | | |
|---|---|---|---|
| CN | 101210067 A | | 7/2008 |
| CN | 101959927 A | | 1/2011 |
| CN | 102027049 A | | 4/2011 |
| CN | 103160081 A | | 6/2013 |
| CN | 103282435 A | | 9/2013 |
| JP | 02-191638 A | * | 7/1990 |
| KR | 10-0728662 B1 | * | 6/2007 |
| TW | 201223996 A1 | | 6/2012 |

OTHER PUBLICATIONS

Aoki et al., "Dynamic Mechanical Properties of Poly(ethylene terephthalate)/Poly(ethylene 2,6-naphtalate) Blends", Macromolecules (1999), 32, p. 1923-1929.

Cakmak et al., "Processing Characteristics, Structure Development, and Properties of Uni and Biaxially Stretched Poly(Ethylene 2,6 Naphtalate) (PEN) Films", Polymer Engineering and Science, Jun. 1990, vol. 30, No. 12, p. 721-733.

Choi et al., "Polymers for flexible displays: From material selection to device applications", Science Direct, Prog. Polym. Sci. 33 (2008), p. 581-630.

Greener et al., "Physical and Microstructural Effects of Heat Setting in Polyester Films", Eastman Kodak Company, Polymer Engineering and Science, Dec. 1999, vol. 39, No. 12, p. 2403-2418.

Turner, "Development of Amorphous Copolyesters Based on 1,4-Cyclohexanedimethanol", Highlight, Journal of Polymer Science: Part A: Polymer Chemistry, vol. 42, p. 5847-5852, (2004).

Taiwanese Office Action for Taiwanese Application No. 102140425, dated Mar. 23, 2015.

Wu et al., "Poly(ethylene terephthalate)/Poly(ethylene glycol-co-1,3/1,4-cyclohexanedimethanol terephthalate)/Clay Nanocomposites: Mechanical Properties, Optical . . . ," Journal of Applied Polymer Science, vol. 131, Issue 3, Feb. 5, 2014 (Published online Sep. 5, 2013), pp. 1-7.

Chinese Office Action and Search Report dated Dec. 10, 2015, for Chinese Application No. 201310711239.5.

* cited by examiner

POLYESTER COMPOSITION, ELECTRONIC DEVICE, AND METHOD OF FORMING FILM

CROSS REFERENCE TO RELATED APPLICATIONS

The application is based on, and claims priority from, Taiwan Application Serial Number 102140425, filed on Nov. 7, 2013, the disclosure of which is hereby incorporated by reference herein in its entirety

TECHNICAL FIELD

The technical field relates to a polyester composition.

BACKGROUND

In conventional display devices or other electronic devices, a transparent glass substrate is usually selected as a substrate material. However, the trend of display devices and other electronic devices is towards lighter weights and thinner shapes while electronic products usage and dependence increase with time. Therefore, a flexible display device (or another electronic device) having excellent properties such as mobility, flexibility, wearability, and impact resistance is needed. Although plastic substrates are selected as a flexible substrate collocated with an active display, an OLED illumination, and a printed circuit, they should meet the requirement of thermal resistance, light transmittance, dimensional stability, and the likes.

For example, a light diffusion film, a brightness enhancement film, and other optical films in a thinner display would be integrated into a single optical film. The integrated optical film must be closer to a heat source, and therefore being thermally deformed after long-time use (or during high temperature LCD processes). In addition, a display with a larger display area needs a higher brightness, leading to more heat being produced by a backlight module. Accordingly, enhancing the dimensional stability of the optical film is necessary in this field.

SUMMARY

One embodiment of the disclosure provides a polyester composition, comprising: 50 to 85 parts by weight of a first polyester and 50 to 15 parts by weight of a second polyester blended to each other; wherein the first polyester is polyethylene terephthalate, polyethylene naphthalate, or combinations thereof; wherein the second polyester is copolymerized of 1 part by mole of terephthalic acid, m parts by mole of 1,4-cyclohexanedimethanol, n parts by mole of 1,3-cyclohexanedimethanol, and o parts by mole of ethylene glycol, wherein $m+n+o=1$, $0 \le o \le 0.4$, $0.6 \le m+n \le 1$, and $0.06 \le n/m \le 1.31$.

One embodiment of the disclosure provides an electronic device, comprising a substrate and/or an optical film, wherein the substrate and/or the optical film comprise the described polyester composition.

One embodiment of the disclosure provides a method of forming a film, comprising: drying and mixing 50 to 85 parts by weight of a first polyester and 50 to 15 parts by weight of a second polyester to form a mixture, wherein the first polyester is polyethylene terephthalate, polyethylene naphthalate, or combinations thereof; wherein the second polyester is copolymerized of 1 part by mole of terephthalic acid, m parts by mole of 1,4-cyclohexanedimethanol, n parts by mole of 1,3-cyclohexanedimethanol, and o parts by mole of ethylene glycol, wherein $m+n+o=1$, $0 \le o \le 0.4$, $0.6 \le m+n \le 1$, and $0.06 \le n/m \le 1.31$; melting and blending the mixture to form a polyester composition, and extruding the polyester composition to form a sheet; biaxially stretching the sheet to form a film; and thermally setting the film.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

50 to 85 parts by weight of a first polyester and 50 to 15 parts by weight of a second polyester are blended to each other. The first polyester is polyethylene terephthalate (PET), polyethylene naphthalate (PEN), or combinations thereof. In one embodiment, the first polyester has an intrinsic viscosity of 0.5 dL/g to 0.8 dL/g at 25° C. A first polymer having an overly high intrinsic viscosity (e.g. an overly high molecular weight) cannot be easily processed due to low flowability. A first polymer having an overly low intrinsic viscosity (e.g. an overly low molecular weight) cannot form a film due to low mechanical properties.

The second polyester is copolymerized of 1 part by mole of terephthalic acid, m parts by mole of 1,4-cyclohexanedimethanol, n parts by mole of 1,3-cyclohexanedimethanol, and o parts by mole of ethylene glycol. $m+n+o=1$, $0 \le o \le 0.4$, $0.6 \le m+n \le 1$, and $0.06 \le n/m \le 1.31$. In one embodiment, $o=0$, and the second polyester is copolymerized of 1 part by mole of terephthalic acid, m parts by mole of 1,4-cyclohexanedimethanol, and n parts by mole of 1,3-cyclohexanedimethanol, wherein $m+n=1$, and $0.06 \le n/m \le 1.31$. An overly high ratio of the ethylene glycol (e.g. an overly high value of o) may cause the second polyester to have poor light transmittance due to high crystallinity, and the blend of the first polyester and the second polyester has a low compatibility, a poor dimensional stability, and a poor light transmittance. An overly high ratio of the 1,4-cyclohexanedimethanol (e.g. an overly high value of m and an overly low value of n/m) may cause the second polyester to have poor light transmittance due to high crystallinity, and the blend of the first polyester and the second polyester has low compatibility, poor dimensional stability, and poor light transmittance. An overly low ratio of the 1,4-cyclohexanedimethanol (e.g. an overly low value of m and an overly high value of n/m) may cause the blend of the first polyester and the second polyester to have low dimensional stability. In one embodiment, the second polyester has an intrinsic viscosity of 0.5 dL/g to 0.8 dL/g at 25° C. The second polymer having an overly high intrinsic viscosity (e.g. an overly high molecular weight) cannot be easily processed due to low flowability. The second polymer having an overly low intrinsic viscosity (e.g. an overly low molecular weight) cannot form a film due to low mechanical properties. A condensation polymerization catalyst such as an antimony-based catalyst, a titanium-based catalyst, a germanium-based catalyst, a tin-based catalyst, a gallium-based catalyst, an aluminum-based catalyst, or combinations thereof can be added during polymerization. In one embodiment, the catalyst is antimony acetate ($Sb(OOCCH_3)_3$) or tetra-butyl titanate ($Ti[O(CH_2)_3CH_3]_4$). The catalyst content is of about 25 ppm to 500 ppm.

An overly high ratio of the first polyester in the polyester composition will result in film having an overly low light transmittance. An overly low ratio of the first polyester in the polyester composition will result in film having a poor thermal resistance and a poor dimensional stability.

The first polyester (e.g. PEN or PET) and the second polyester are dried and then mixed. In the following high temperature processes, the polyester having an overly high amount of moisture may degrade to negatively influence the product properties. Circulating air at a temperature of 70° C. to 120° C. for a period of at least about 24 hours can be employed to dry the polyesters. Alternatively, a vacuum drying process at a temperature of about 60° C. to 90° C. for a period of about 4 to 8 hours (or a longer period) can be selected to dry the polyester. After drying the polyesters, the first and the second polyester pellets can be evenly pre-mixed with different blend ratios. An overly low drying temperature and/or an overly short drying period cannot efficiently remove the moisture in the polyesters.

Subsequently, the mixture of the first polyester and the second polyester is melted and blended to form a polyester composition, which is then extruded to form a sheet. The melting process can be performed by a twin-screw extruder or a brabender with a process temperature of 260° C. to 310° C. An overly high melting temperature may form a polyester composition having an overly low melting viscosity, thereby negatively influencing the step of extruding the polyester composition to form the sheet by a T-die. Moreover, the molten blend may crack during high temperature processes due to the overly hot melting process. An overly low melting temperature may form a polyester composition having an overly high melting viscosity, such that the melting and blending process cannot be easily performed due to an overly high rotation moment. The twin-screw extruder has a screw rotation rate of about 200 rpm to 800 rpm. If an overly high screw rotation rate is selected, the melting and blending process cannot be easily performed due to an overly high rotation moment of the twin-screw extruder. On the other hand, an overly low screw rotation rate cannot evenly blend the first polyester and the second polyester. The molten and blended mixture of the polyesters is extruded by the T-die and then passed through a casting drum to form a sheet having a uniform thickness. The casting drum temperature is usually lower than the glass transition temperature (Tg) of the polyester composition, thereby quickly cooling the molten polyesters.

Thereafter, the sheet is biaxially stretched to form a film. The sheet can be pre-heated by a temperature higher than the Tg of the film, and then simultaneously or sequentially stretched at a specific stretching speed in two perpendicular directions. As such, thermal properties, mechanical properties, uniformity, and dimensional stability of the film can be enhanced by the biaxial stretching. In one embodiment, the sheet can be stretched by one step or step-by-step in a hot air circulating oven. Alternatively, the biaxial stretching is a continuous two-step stretching process. First, the sheet is stretched according to a longitudinal direction of the sheet by a heated roll, thereby increasing the tensile strength in the machine direction (MD) of the film. Next, the stretched sheet is heated by circulating hot air and then stretched according to a transverse direction (TD) of the sheet in an oven. The sheet can be simultaneously biaxially stretched in one step by a biaxially stretching machine (Bruckner KARO IV). The polyester molecules in the sheet will be orientated during the stretching, thereby forming an anisotropic film. In addition, the sheet can be biaxially stretched by a hot air circulating motor, which may provide a suitable air flow rate from a suitable rotation rate, e.g. about 1400 rpm to 1800 rpm. In one embodiment, the biaxial stretching has a stretching speed of 1 mm/sec to 100 mm/sec. An overly high stretching speed may result an overly high stress, thereby breaking the film during processing. An overly low stretching speed cannot efficiently improve the film properties by the biaxial stretching. In one embodiment, the biaxial stretching is performed at a stretching temperature of about 120° C. to 160° C. An overly high stretching temperature will overly soften the sheet, such that a film without a uniform thickness is the result. In a worse condition, a cave will be formed in a center area of the film due to the overly high stretching temperature. An overly low stretching temperature cannot soften the sheet to be stretched, and the film may break during the stretching. The biaxial stretching is performed at a stretching ratio of greater than 1×1 and less than or equal to 6×6. In one embodiment, the stretching ratio is 1.25×1.25 to 4×4. An overly high stretching ratio may break the film.

After the biaxial stretching, the film is further treated by thermal setting. The biaxially stretched polymer chains of the film are separated and straightened by external stress and temperature, such that the polymer molecules move to largely deform. If the film is directly cooled to a temperature lower than the Tg of the film being molded, internal stress will remain in molecules. As such, the dimension of the directly cooled film was unstable. In other words, thermal setting treatment is necessary for the film to have a low thermal contraction. The thermal setting may satisfy different requirements of different materials. The thermal setting treatment may accelerate secondary crystallization or crystal growth of a crystalline polymer, thereby orienting the molecular chains to the crystallization direction, eliminating the internal stress, increasing the crystallinity, perfecting the crystal structure, enhancing the mechanical properties, and reducing the thermal contraction at the high temperature of the film. In one embodiment, the thermal setting is performed at a temperature of about 180° C. to 250° C. for a period of about 3 seconds to 180 seconds. An overly high thermal setting temperature and/or an overly long thermal setting period cannot further increase the effect of the thermal setting. An overly low thermal setting temperature and/or an overly short thermal setting period cannot efficiently reduce the thermal contraction at the high temperature of the film. In other words, the film cannot have enough dimensional stability from the overly low thermal setting temperature and/or the overly short thermal setting period.

In the above embodiments, the steps of mixing, melting and blending, extruding, biaxial stretching, and thermal setting form the film having a birefringence coefficient of about 0.01 to 0.02 and a light transmittance of 88% to 100%. Compared to conventional polyester films, the polyester composition films of the disclosure have a low birefringence coefficient without sacrificing the high light transmittance, thereby being suitable for substrates of electronic devices. In one embodiment, the electronic devices can be flexible liquid crystal displays or flexible active displays. In one embodiment, the electronic devices can be flexible, e.g. flexible RFIDs, flexible solar cells, flexible LED illumination elements, flexible printed circuits, or the likes. Specifically, the polyester composition film can be applied to flexible active OLED displays or flexible RFID devices. For example, a thin film transistor (TFT) can be manufactured on a polyester composition film overlying a glass hard carrier. Subsequently, the glass hard carrier is removed. The TFT manufacture can be an organic thin film transistor (OTFT) process, or a TFT process with a process temperature lower than 130° C. On the other hand, the polyester composition film may serve as an optical film in displays, such as an optical protective film, a release film, a brightness enhancement film, a retardation film, a polarizer film, a polarizer protective film, an anti-reflection film, a light guide plate, or a light diffusion film.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In the following Examples, the polyethylene naphthalate (PEN), TN-80655 commercially available from Teijin, had a weight-average molecular weight of about 35000. The polyethylene terephthalate (PET), TR-8550T commercially available from Teijin, had a weight-average molecular weight of about 37500. The intrinsic viscosity, Tg, and Tm of the PEN and the PET are tabulated in Table 1.

In the following Examples, 1,3/1,4-cyclohexanedimethanol (UNOXOL™ 34 Diol commercially available from Dow Chemical Company) included 24 mol % of trans-1,3-cyclohexanedimethanol, 32.8 mol % of cis-1,3-cyclohexanedimethanol, 30.2 mol % of trans-1,4-cyclohexanedimethanol, and 13.0 mol % of cis-1,4-cyclohexanedimethanol. In other words, the 1,3/1,4-cyclohexanedimethanol included 56.8 mol % of 1,3-cyclohexanedimethanol and 43.2 mol % of 1,4-cyclohexanedimethanol. The 1,4-cyclohexanedimethanol (C0479 commercially available from TCI) included 70 mol % of trans-1,4-cyclohexanedimethanol and 30 mol % of cis-1,4-cyclohexanedimethanol.

In the following Examples, the intrinsic viscosity of the polyesters and the polyester compositions were measured according to ASTM D4603.

In the following Examples, the Tg and Tm of the polyesters and the polyester compositions were measured by a differential scanning calorimetry (Q2000, commercially available from TA instruments.

In the following Examples, the thermal contraction properties of the films were measured by a thermal mechanical analyzer (Q-600, commercially available from TA instruments). The Tg, α of the films were measured by a dynamic mechanical analyzer (Q800, commercially available from TA instruments). The total light transmittances of the films were measured by a haze meter (NDH 2000, commercially available from Nippon Denshoku Industries Co., Ltd.) The birefringence coefficients of the films for light with a wavelength of 550 nm were measured by a retardation analyzer (AxoScan, commercially available from Axometrics).

Comparative Example 1

166 g of terephthalic acid (TPA) and 144 g of 1,4-cyclohexanedimethanol (1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCT-0 was obtained. The intrinsic viscosity at 25° C., the Tg, and the Tm of the polyester PCT-0 are tabulated in Table 1.

Comparative Example 2

166 g of terephthalic acid (TPA), 24.8 g of ethylene glycol (EG), and 86.4 g of 1,4-cyclohexanedimethanol (1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{40}$-0 was obtained. The intrinsic viscosity at 25° C., the Tg, and the Tm of the polyester $PCTG_{40}$-0 are tabulated in Table 1.

Example 1

166 g of terephthalic acid (TPA), 129.6 g of 1,4-cyclohexanedimethanol (1,4-CHDM), and 14.4 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCT-10 was obtained. The intrinsic viscosity at 25° C., the Tg, and the Tm of the polyester PCT-10 are tabulated in Table 1.

Example 2

166 g of terephthalic acid (TPA), 108 g of 1,4-cyclohexanedimethanol (1,4-CHDM), and 36 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCT-25 was obtained. The intrinsic viscosity at 25° C., the Tg, and the Tm of the polyester PCT-25 are tabulated in Table 1.

Example 3

166 g of terephthalic acid (TPA), 72 g of 1,4-cyclohexanedimethanol (1,4-CHDM), and 72 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCT-50 was obtained. The intrinsic viscosity at 25° C., the Tg, and the Tm of the polyester PCT-50 are tabulated in Table 1.

Example 4

166 g of terephthalic acid (TPA) and 144 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCT-100 was obtained. The intrinsic viscosity at 25° C., the Tg, and the Tm of the polyester PCT-100 are tabulated in Table 1.

Example 5

166 g of terephthalic acid (TPA), 6.2 g of ethylene glycol (EG), 116.64 g of 1,4-cyclohexanedimethanol (1,4-CHDM), and 12.96 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{10}$-10 was obtained. The intrinsic viscosity at 25° C., the Tg, and the Tm of the polyester PCTG$_{10}$-10 are tabulated in Table 1.

Example 6

166 g of terephthalic acid (TPA), 6.2 g of ethylene glycol (EG), 97.2 g of 1,4-cyclohexanedimethanol (1,4-CHDM), and 32.4 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{10}$-25 was obtained. The intrinsic viscosity at 25° C., the Tg, and the Tm of the polyester PCTG$_{10}$-25 are tabulated in Table 1.

Example 7

166 g of terephthalic acid (TPA), 6.2 g of ethylene glycol (EG), 64.8 g of 1,4-cyclohexanedimethanol (1,4-CHDM), and 64.8 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{10}$-50 was obtained. The intrinsic viscosity at 25° C., the Tg, and the Tm of the polyester PCTG$_{10}$-50 are tabulated in Table 1.

Example 8

166 g of terephthalic acid (TPA), 6.2 g of ethylene glycol (EG), and 129.6 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{10}$-100 was obtained. The intrinsic viscosity at 25° C., the Tg, and the Tm of the polyester PCTG$_{10}$-100 are tabulated in Table 1.

Example 9

166 g of terephthalic acid (TPA), 12.4 g of ethylene glycol (EG), 103.68 g of 1,4-cyclohexanedimethanol (1,4-CHDM), and 11.52 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{20}$-10 was obtained. The intrinsic viscosity at 25° C., the Tg, and the Tm of the polyester PCTG$_{20}$-10 are tabulated in Table 1.

Example 10

166 g of terephthalic acid (TPA), 12.4 g of ethylene glycol (EG), 86.4 g of 1,4-cyclohexanedimethanol (1,4-CHDM), and 28.8 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{20}$-25 was obtained. The intrinsic viscosity at 25° C., the Tg, and the Tm of the polyester PCTG$_{20}$-25 are tabulated in Table 1.

Example 11

166 g of terephthalic acid (TPA), 12.4 g of ethylene glycol (EG), 57.6 g of 1,4-cyclohexanedimethanol (1,4-CHDM), and 57.6 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{20}$-50 was obtained. The intrinsic viscosity at 25° C., the Tg, and the Tm of the polyester PCTG$_{20}$-50 are tabulated in Table 1.

Example 12

166 g of terephthalic acid (TPA), 12.4 g of ethylene glycol (EG), and 115.2 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{20}$-100 was obtained. The intrinsic viscosity at 25° C., the Tg, and the Tm of the polyester PCTG$_{20}$-100 are tabulated in Table 1.

Example 13

166 g of terephthalic acid (TPA), 18.6 g of ethylene glycol (EG), 90.72 g of 1,4-cyclohexanedimethanol (1,4-CHDM), and 10.08 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{30}$-10 was obtained. The intrinsic viscosity at 25° C., the Tg, and the Tm of the polyester PCTG$_{30}$-10 are tabulated in Table 1.

Example 14

166 g of terephthalic acid (TPA), 18.6 g of ethylene glycol (EG), 75.6 g of 1,4-cyclohexanedimethanol (1,4-CHDM), and 25.2 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{30}$-25 was obtained. The intrinsic viscosity at 25° C., the Tg, and the Tm of the polyester PCTG$_{30}$-25 are tabulated in Table 1.

Example 15

166 g of terephthalic acid (TPA), 18.6 g of ethylene glycol (EG), 50.4 g of 1,4-cyclohexanedimethanol (1,4-CHDM), and 50.4 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester PCTG$_{30}$-50 was obtained. The intrinsic viscosity at 25° C., the Tg, and the Tm of the polyester PCTG$_{30}$-50 are tabulated in Table 1.

Example 16

166 g of terephthalic acid (TPA), 18.6 g of ethylene glycol (EG), and 100.8 g of 1,3/1,4-cyclohexanedimethanol (1,3/

1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{30}$-100 was obtained. The intrinsic viscosity at 25° C., the Tg, and the Tm of the polyester $PCTG_{30}$-100 are tabulated in Table 1.

Example 17

166 g of terephthalic acid (TPA), 24.8 g of ethylene glycol (EG), 77.76 g of 1,4-cyclohexanedimethanol (1,4-CHDM), and 8.64 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{40}$-10 was obtained. The intrinsic viscosity at 25° C., the Tg, and the Tm of the polyester $PCTG_{40}$-10 are tabulated in Table 1.

Example 18

166 g of terephthalic acid (TPA), 24.8 g of ethylene glycol (EG), 64.8 g of 1,4-cyclohexanedimethanol (1,4-CHDM), and 21.6 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{40}$-25 was obtained. The intrinsic viscosity at 25° C., the Tg, and the Tm of the polyester $PCTG_{40}$-25 are tabulated in Table 1.

Example 19

166 g of terephthalic acid (TPA), 24.8 g of ethylene glycol (EG), 43.2 g of 1,4-cyclohexanedimethanol (1,4-CHDM), and 43.2 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{40}$-50 was obtained. The intrinsic viscosity at 25° C., the Tg, and the Tm of the polyester $PCTG_{40}$-50 are tabulated in Table 1.

Example 20

166 g of terephthalic acid (TPA), 24.8 g of ethylene glycol (EG), and 86.4 g of 1,3/1,4-cyclohexanedimethanol (1,3/1,4-CHDM) were esterified at 240° C. to 250° C. for about 4 hours, and then condensation polymerized with 350 ppm of antimony acetate at 280° C. to 290° C. for about 4 hours. After two steps of esterification and condensation polymerization, a polyester $PCTG_{40}$-100 was obtained. The intrinsic viscosity at 25° C., the Tg, and the Tm of the polyester $PCTG_{40}$-100 are tabulated in Table 1.

TABLE 1

| | | Diol monomer molar ratio | | | [η] | DSC | |
|---|---|---|---|---|---|---|---|
| | | EG | 1,3-CHDM | 1,4-CHDM | (dL/g) | Tg (° C.) | Tm (° C.) |
| Commercially available product | PET | 100 | 0 | 0 | 0.74 | 78.0 | 254.3 |
| Commercially available product | PEN | 100 | 0 | 0 | 0.69 | 115.0 | 266.4 |
| Comparative Example 1 | PCT-0 | 0 | 0 | 100 | 0.72 | 90.5 | 294.5 |
| Comparative Example 2 | $PCTG_{40}$-0 | 40 | 0 | 60 | 0.70 | 85.3 | 226.5 |
| Example 1 | PCT-10 | 0 | 5.68 | 94.32 | 0.74 | 90.1 | 289.4 |
| Example 2 | PCT-25 | 0 | 14.2 | 85.8 | 0.73 | 89.6 | 278.4 |
| Example 3 | PCT-50 | 0 | 28.4 | 71.6 | 0.72 | 87.2 | 242.5 |
| Example 4 | PCT-100 | 0 | 56.8 | 43.2 | 0.74 | 84.0 | — |
| Example 5 | $PCTG_{10}$-10 | 10 | 5.112 | 84.888 | 0.72 | 89.2 | 259.9 |
| Example 6 | $PCTG_{10}$-25 | 10 | 12.78 | 77.22 | 0.73 | 87.8 | 249.1 |
| Example 7 | $PCTG_{10}$-50 | 10 | 25.56 | 64.44 | 0.70 | 86.0 | — |
| Example 8 | $PCTG_{10}$-100 | 10 | 51.12 | 38.88 | 0.73 | 83.6 | — |
| Example 9 | $PCTG_{20}$-10 | 20 | 4.544 | 75.456 | 0.72 | 88.3 | 250.3 |
| Example 10 | $PCTG_{20}$-25 | 20 | 11.36 | 68.64 | 0.71 | 86.7 | 241.1 |
| Example 11 | $PCTG_{20}$-50 | 20 | 22.72 | 57.28 | 0.70 | 85.3 | — |
| Example 12 | $PCTG_{20}$-100 | 20 | 45.44 | 34.56 | 0.73 | 83.2 | — |
| Example 13 | $PCTG_{30}$-10 | 30 | 3.976 | 66.024 | 0.72 | 86.2 | 240.5 |
| Example 14 | $PCTG_{30}$-25 | 30 | 9.94 | 60.06 | 0.72 | 85.9 | — |
| Example 15 | $PCTG_{30}$-50 | 30 | 19.88 | 50.12 | 0.72 | 84.5 | — |
| Example 16 | $PCTG_{30}$-100 | 30 | 39.76 | 30.24 | 0.71 | 83.0 | — |
| Example 17 | $PCTG_{40}$-10 | 40 | 3.408 | 56.592 | 0.70 | 85.1 | — |
| Example 18 | $PCTG_{40}$-25 | 40 | 8.52 | 51.48 | 0.71 | 84.9 | — |
| Example 19 | $PCTG_{40}$-50 | 40 | 17.04 | 42.96 | 0.73 | 84.0 | — |
| Example 20 | $PCTG_{40}$-100 | 40 | 34.08 | 25.92 | 0.72 | 83.0 | — |

As shown in Table 1, the glass transition temperature (Tg) and crystallinity of the polyester could be modified by changing the 1,3/1,4-CHDM ratio and the cis/trans-CHDM ratio, thereby synthesizing the amorphous polyesters (or the polyesters with low-crystallinity) having Tg higher than PET.

Example I 85 parts by weight of the commercially available PEN and 15 parts by weight of the PCT-25 were weighted, respectively, and evenly mixed. The mixture was dried in a hot air circulating oven at 70° C. for 24 hours, and then molted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example II 75 parts by weight of the commercially available PEN and 25 parts by weight of the PCT-25 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example III 50 parts by weight of the commercially available PEN and 50 parts by weight of the PCT-25 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example IV 85 parts by weight of the commercially available PEN and 15 parts by weight of the PCT-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example V 75 parts by weight of the commercially available PEN and 25 parts by weight of the PCT-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example VI 50 parts by weight of the commercially available PEN and 50 parts by weight of the PCT-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example VII 85 parts by weight of the commercially available PEN and 15 parts by weight of the $PCTG_{20}$-25 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example VIII 75 parts by weight of the commercially available PEN and 25 parts by weight of the $PCTG_{20}$-25 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example IX 50 parts by weight of the commercially available PEN and 50 parts by weight of the $PCTG_{20}$-25 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example X 85 parts by weight of the commercially available PEN and 15 parts by weight of the $PCTG_{20}$-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example XI 75 parts by weight of the commercially available PEN and 25 parts by weight of the $PCTG_{20}$-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Example XII 50 parts by weight of the commercially available PEN and 50 parts by weight of the $PCTG_{20}$-100 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Comparative Example I

PET pellets were vibration sieved by a screen mesh to remove fine dust and fragments thereon. The sieved PET pellets were then dried in a hot air circulating oven at 70° C. for 24 hours to ensure that the PET pellets were completely dried. The dried PET pellets were melted by a twin-screw extruder with a screw rotation rate of 500 rpm at a temperature of 260° C. to 310° C. Thereafter, the molten PET was extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 95° C. and remained at 95° C. for 60 seconds. The pre-heated sheet was simultaneously biaxially stretched at a stretching temperature of 95° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 210° C. for 30 seconds. The thermal contraction property, the Tg, α, the total light transmittance, and the birefringence coefficient of the film with the biaxial stretching time (length×width) of 4×4 are tabulated in Table 2.

Comparative Example II

PEN pellets were vibration sieved by a screen mesh to remove fine dust and fragments thereon. The sieved PEN pellets were then dried in a hot air circulating oven at 70° C. for 24 hours to ensure that the PEN pellets were completely dried. The dried PEN pellets were melted by a twin-screw extruder with a screw rotation rate of 500 rpm at a temperature of 260° C. to 310° C. Thereafter, the molten PEN was extruded by a T-die to form a transparent sheet. The transparent sheet was then passed through a casting drum at a temperature of 70° C. to achieve a uniform thickness. The sheet was cut to 117 mm×117 mm, and then simultaneously biaxially stretched in a biaxial stretcher. First, the sheet was pre-heated to 140° C. and remained at 140° C. for 60 seconds. The pre-heated sheet was simultaneously biaxially stretched at a stretching temperature of 140° C., a hot air circulating motor rotation rate of 1700 rpm, and a stretching speed of 10 mm/sec for a biaxial stretching time (length×width) of 1.25×1.25 to 4×4 for forming films. The films were treated (thermal setting) at a temperature of 230° C. for 30 seconds. The thermal contraction property, the Tg, α, the total light transmittance, and the birefringence coefficient of the film with the biaxial stretching time (length×width) of 4×4 are tabulated in Table 2.

Next, 50 to 85 parts by weight of the commercially available PEN and 50 to 15 parts by weight of the copolyesters in Comparative Examples 1 to 2 were weighted, respectively, and evenly mixed. The mixture was dried in a hot air circulating oven at 70° C. for 24 hours, and then melted and blended by a twin-screw extruder with a screw rotation rate of about 500 rpm at a temperature of 260° C. to 310° C. to form a blended polyester composition. Thereafter, a blended polyester composition was melted and extruded by a T-die, but the blended polyester composition had a too low compatibility to be extruded as a transparent sheet.

TABLE 2

|  | Polyester (weight ratio) | TMA Thermal contraction (%) (150° C., 30 min) | DMA Tg, α (° C.) | Total light transmittance (%) | Birefringence coefficient (550 nm) ΔNx-y |
|---|---|---|---|---|---|
| Comparative Example I | PET | 2.54 | 125.5 | 89.1 | 0.0174 |
| Comparative Example II | PEN | 0.40 | 162.3 | 87.2 | 0.0344 |
| Example I | PEN/PCT-25 (85/15) | 0.45 | 157.2 | 88.4 | 0.0205 |
| Example II | PEN/PCT-25 (75/25) | 0.72 | 144.3 | 89.3 | 0.0170 |
| Example III | PEN/PCT-25 (50/50) | 1.73 | 135.8 | 89.8 | 0.0143 |
| Example IV | PEN/PCT-100 (85/15) | 0.50 | 151.6 | 89.3 | 0.0175 |
| Example V | PEN/PCT-100 (75/25) | 0.82 | 140.0 | 89.9 | 0.0143 |
| Example VI | PEN/PCT-100 (50/50) | 1.95 | 130.5 | 90.6 | 0.0106 |
| Example VII | PEN/PCTG$_{20}$-25 (85/15) | 0.47 | 154.4 | 88.6 | 0.0197 |
| Example VIII | PEN/PCTG$_{20}$-25 (75/25) | 0.80 | 142.5 | 89.4 | 0.0166 |
| Example IX | PEN/PCTG$_{20}$-25 (50/50) | 1.82 | 133.4 | 90.1 | 0.0133 |
| Example X | PEN/PCTG$_{20}$-100 (85/15) | 0.51 | 150.5 | 89.0 | 0.0188 |
| Example XI | PEN/PCTG$_{20}$-100 (75/25) | 0.88 | 139.7 | 89.6 | 0.0159 |
| Example XII | PEN/PCTG$_{20}$-100 (50/50) | 2.01 | 130.1 | 90.2 | 0.0126 |

As shown in Table 2, the polyester composition film of Examples II, III, IV, V, VI, VIII, IX, and XII had higher total light transmittance than that of the polyester films of Comparative Examples I and II.

As shown in Table 2, the dimensional stable temperature Tg, α (135.8° C. to 157.2° C.) of the polyester composition films in Examples I-III, the dimensional stable temperature Tg, α (130.5° C. to 151.6° C.) of the polyester composition films in Examples IV-VI, the dimensional stable temperature Tg, α (133.4° C. to 154.4° C.) of the polyester composition films in Examples VII-IX, and the dimensional stable temperature Tg, α (130.1° C. to 150.5° C.) of the polyester composition films in Examples X-XII were higher than the dimensional stable temperature Tg, α (125.5° C.) of the PET film in Comparative Example I.

As shown in Table 2, the thermal contraction ratio of the polyester composition films in Examples I to XII were lower than that of the PET film in Comparative Example I.

In the films, a higher birefringence coefficient means a higher light dispersion effect, which lowers the viewing effect for viewers. In other words, the optical films require a low birefringence coefficient and a high light transmittance. As shown in Table 2, the birefringence coefficient of the polyester composition films in Examples I to XII were lower than that of the polyester film in Comparative Example II, and the birefringence coefficient of the polyester composition films in Examples II, III, V, VI, VIII, IX, XI, and XII were lower than that of the polyester film in Comparative Example I.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A polyester composition, comprising:
   50 to 85 parts by weight of a first polyester and 50 to 15 parts by weight of a second polyester blended to each other;
   wherein the first polyester is polyethylene naphthalate;
   wherein the second polyester is copolymerized of only 1 part by mole of terephthalic acid, m parts by mole of 1,4-cyclohexanedimethanol, n parts by mole of 1,3-cyclohexanedimethanol, and o parts by mole of ethylene glycol, wherein m+n+o=1, 0≤o≤0.4, 0.6≤m+n≤1, and 0.06≤n/m≤1.31,
   wherein the polyester composition forms a film with a thermal contraction ratio of 0.45% to 2.01% at 150° C. for 30 minutes.

2. The polyester composition as claimed in claim 1, wherein o=0, and the second polyester is copolymerized of 1 part by mole of terephthalic acid, m parts by mole of 1,4-cyclohexanedimethanol, and n parts by mole of 1,3-cyclohexanedimethanol, wherein m+n=1, and 0.06≤n/m≤1.31.

3. The polyester composition as claimed in claim 1, wherein 0<o≤0.4, 0.6≤m+n<1.

4. The polyester composition as claimed in claim 1, wherein the first polyester has an intrinsic viscosity of 0.5 dL/g to 0.8 dL/g at 25° C.

5. The polyester composition as claimed in claim 1, wherein the second polyester has an intrinsic viscosity of 0.5 dL/g to 0.8 dL/g at 25° C.

6. An electronic device, comprising a substrate and/or an optical film, wherein the substrate and/or the optical film comprise the polyester composition as claimed in claim 1.

7. The electronic device as claimed in claim 6, comprising a display, and the optical film comprises an optical protective film, a release film, a brightness enhancement film, a retardation film, a polarizer film, a polarizer protective film, an anti-reflection film, a light guide plate, or a light diffusion film.

8. A method of forming a film, comprising:

drying and mixing 50 to 85 parts by weight of a first polyester and 50 to 15 parts by weight of a second polyester to form a mixture, wherein the first polyester is polyethylene naphthalate; wherein the second polyester is copolymerized of only 1 part by mole of terephthalic acid, m parts by mole of 1,4-cyclohexanedimethanol, n parts by mole of 1,3-cyclohexanedimethanol, and o parts by mole of ethylene glycol, wherein m+n+o=1, 0≤o≤0.4, 0.6≤m+n≤1, and 0.06≤n/m≤1.31;

melting and blending the mixture to form a polyester composition, and extruding the polyester composition to form a sheet;

biaxially stretching the sheet to form a film; and thermally setting the film, wherein the film has a thermal contraction ratio of 0.45% to 2.01% at 150° C. for 30 minutes.

9. The method as claimed in claim 8, wherein o=0, and the second polyester is copolymerized of 1 part by mole of terephthalic acid, m parts by mole of 1,4-cyclohexanedimethanol, and n parts by mole of 1,3-cyclohexanedimethanol, wherein m+n=1, and 0.06≤n/m≤1.31.

10. The method as claimed in claim 8, wherein 0<o≤0.4, 0.6≤m+n<1.

11. The method as claimed in claim 8, wherein the first polyester has an intrinsic viscosity of 0.5 dL/g to 0.8 dL/g at 25° C.

12. The method as claimed in claim 8, wherein the second polyester has an intrinsic viscosity of 0.5 dL/g to 0.8 dL/g at 25° C.

13. The method as claimed in claim 8, wherein the step of melting and blending the mixture to form the polyester composition, and extruding the polyester composition to form the sheet is performed by a twin-screw extruder or a brabender with a screw rotation rate of 200 rpm to 800 rpm.

14. The method as claimed in claim 8, wherein the step of melting and blending the mixture to form the polyester composition, and extruding the polyester composition to form the sheet is performed by a twin-screw extruder or a brabender with a process temperature of 260° C. to 310° C.

15. The method as claimed in claim 8, wherein the step of biaxially stretching the sheet to form the film is performed by a circulating hot air motor with a rotation rate of 1400 rpm to 1800 rpm.

16. The method as claimed in claim 8, wherein the step of biaxially stretching the sheet to form the film is performed by a circulating hot air motor with a stretching speed of 1 mm/sec to 100 mm/sec.

17. The method as claimed in claim 8, wherein the step of biaxially stretching the sheet to form the film is performed by a circulating hot air motor with a stretching ratio of greater than 1×1 and less than or equal to 6×6.

18. The method as claimed in claim 8, wherein the step of biaxially stretching the sheet to form the film is performed by a circulating hot air motor with a process temperature of 120° C. to 160° C.

19. The method as claimed in claim 8, wherein the step of thermally setting the film is performed at a temperature of 180° C. to 250° C.

20. The method as claimed in claim 8, wherein the step of thermally setting the film is performed for a period of 3 seconds to 180 seconds.

* * * * *